US006614381B1

(12) United States Patent
Gross et al.

(10) Patent No.: US 6,614,381 B1
(45) Date of Patent: Sep. 2, 2003

(54) DUAL COMMON CHANNEL CROSS-TRACK SYSTEM (U)

(75) Inventors: Lawrence A. Gross, Stamford, CT (US); Salvatore Amoroso, Jr., Fairfield, CT (US); Russell W. Conklin, Stratford, CT (US); Joseph Gessaroli, Danbury, CT (US)

(73) Assignee: Northrop Grumman Corporation, Los Angeles, CA (US)

( * ) Notice: Subject to any disclaimer, the term of this patent is extended or adjusted under 35 U.S.C. 154(b) by 0 days.

(21) Appl. No.: 05/956,935

(22) Filed: Oct. 30, 1978

(51) Int. Cl.[7] ............................. G01S 7/36; G01S 13/74
(52) U.S. Cl. ......................................... 342/14; 342/42
(58) Field of Search ................... 343/18 E, 18 D, 343/6.8 R; 342/14, 42

(56) References Cited

U.S. PATENT DOCUMENTS 3,160,884 A * 12/1964 Harris et al. ............ 343/6.8 R
3,685,050 A * 8/1972 Cartwright .............. 343/18 D
3,760,418 A * 9/1973 Cash et al. .............. 343/18 D
4,090,196 A * 5/1978 Stevenson, Jr. ........... 343/18 E

* cited by examiner

Primary Examiner—Stephen C. Buczinski

(57) ABSTRACT

A "cross-eye" type radar countermeasure in which both of the waveforms of the illuminating signal from the enemy radar received at spaced locations on the carrying vehicle is propagated through a common dual channel to balance the effect of unintentional phase distortion. Two common channels receive the radar waveform and store the same in a delay line. During the stored interval the switches at the ends of the two common channels are transitioned to the non-stable state connecting the output end of one common channel to the input end of the other, and vice versa. Both waveforms then enter the delay line of the subsequent common channel and the switches change to the stable state whereupon each waveform is retransmitted at the other spaced location on the carrying vehicle. A very accurate phase shift of 180° is introduced into a non-common waveguide and causes an out-of-phase relationship between the two retransmitted radar pulse to create the "cross-eye" type of phase front distortion of the return to the victim radar.

5 Claims, 1 Drawing Sheet

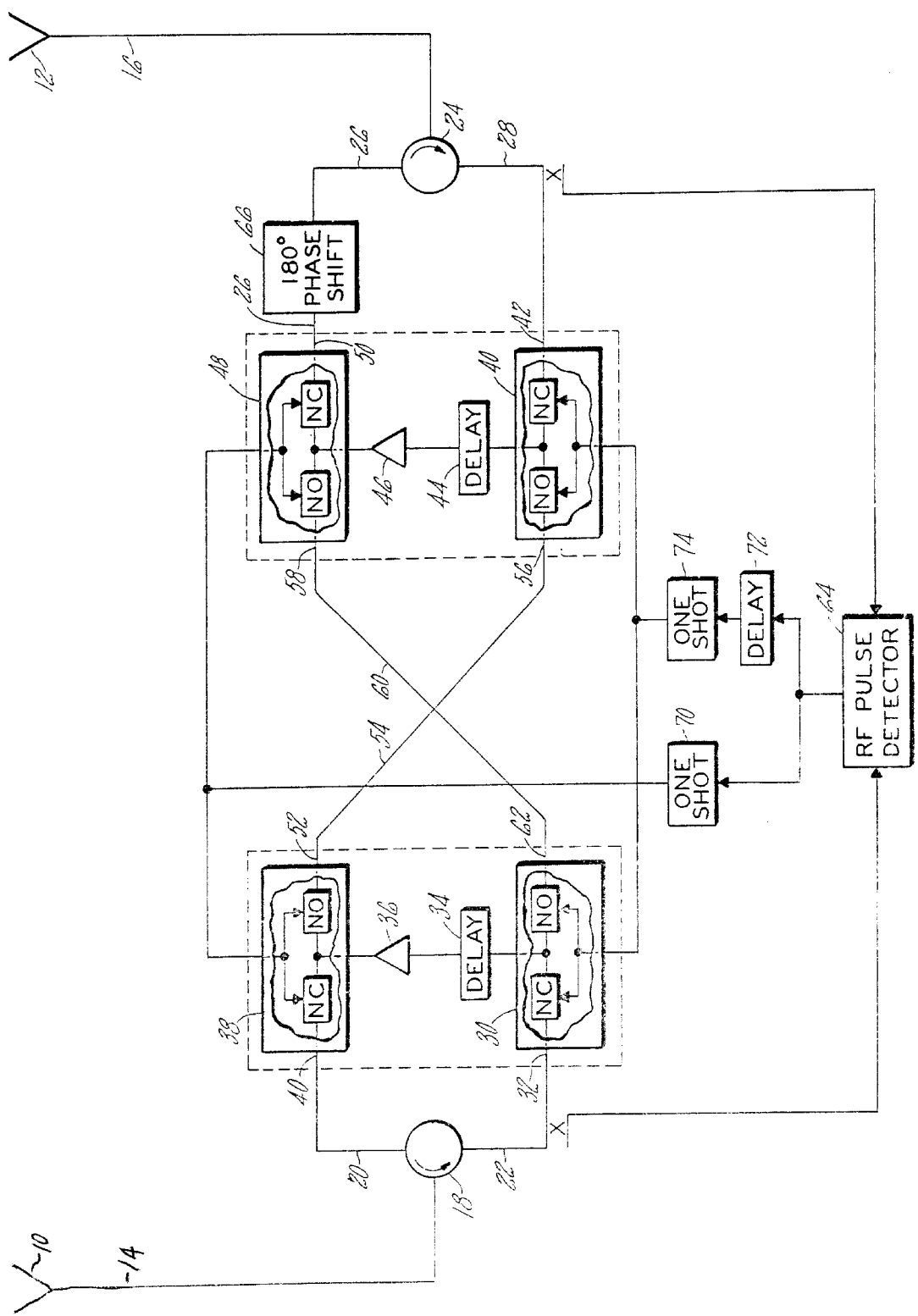

DUAL COMMON CHANNEL CROSS-TRACK SYSTEM (U)

The Government has rights in the invention pursuant to Contract No. F33615-76-C-1288 awarded by the Department of the Air Force.

BACKGROUND OF THE INVENTION

1. Field of the Invention

This invention generally relates to an electronic countermeasure system which retransmits a phase shifted form of the illuminating victim radar signal thereby causing return wave front distortion.

2. Description of the Prior Art

The VanAtta array principle is known and involves the retransmission of an illuminating radar pulse back toward its source. The "cross-eye" countermeasure technique employs this principle in conjunction with the introduction of a 180° phase shift into one of the two radar signals retransmitted from spaced locations on the carrying craft to cause wave front distortion at the location of the victim radar. It is essential that the overall phase shift introduced into the retransmitted pulse be extremely accurate in that a variation of more than ±2–6° of shift causes a beacon effect which easily identifies the location of the carrying craft. The practical application of this technique within the confines of present day technology has been somewhat difficult because of the necessity of maintaining the narrow phase shift tolerance between the enemy radar pulse and retransmitted countermeasure radar pulses.

One prior art countermeasure system utilizing the VanAtta array principle is known as the "switching cross-eye" and involves the use of a first microwave antenna located at the extremity of one portion of the carrying craft, such as the tip of one wing, while a second and identical antenna is positioned at another extremity of the aircraft, such as the tip of the other wing. A waveguide leads from each antenna to a single time multiplexing circuit disposed about midway on the vehicle between the two antennas. The multiplexing circuits comprises a pair of switches which must be capable of operating at switching speeds in the order of two to three times the victim radar bandwidth to sample the incoming radar signals. The circuit then stores each time slice in a single delay line to mitigate the effect of reflections that occur when the high power radiated signals are applied to common antennas. After the time multiplex signal emerges from the delay line, it is supplied to a single amplifier and then to the second switch for distribution to the appropriate antenna port. Although the use of only one amplifier and delay line in a common channel causes a balancing of the phase distortion in the two retransmitted signals, the high switching speed required of the switches located at either end of the common channel is beyond the capability of present day RF switches.

In a commonly owned application, Ser. No. 519,465, by S. Brody, and G. Bock on Aug. 27, 1971 entitled SINGLE AMPLIFIER COUNTERMEASURE (U) there is disclosed a track radar countermeasure utilizing three channels in which a single amplifier is employed in the center channel to amplify the received energy for redirection to the enemy radar. The outside two channels store phase information and are used to recreate the correct phase.

The aforementioned copending application is an improvement over the invention disclosed in another commonly-owned copending application, Ser. No. 334,172, by Richard C. DiDomizio and Lester H. Kosowsky filed on Feb. 12, 1973 entitled AUTOPHASED ANGLE DECEPTION COUNTERMEASURE (U) in which the differences between the phases of signals received at three antennas from the enemy radar is utilized to generate a phase adjustment to the central antennas so that the redirected waves have a proper phase relationship even though the enemy radar is not located on a normal to the alignment of the antennas. Both of the hereabove cited patent applications, and the references cited therein, should be consulted for the purpose of putting the present invention in perspective.

SUMMARY OF THE INVENTION

The principal object of the present invention is to provide an improved track radar countermeasure system in which two common channels are utilized to reduce phase distortion inherent in a channel containing amplifier, delay line, etc. for processing radar frequency signals.

According to the present invention, a switching cross-eye countermeasure system utilizes two common channels between two spaced apart antennas so that any phase distortion introduced by the waveguides, amplifiers, etc. will affect the retransmitted pulses equally, rather than exceeding the phase tolerance limits acceptable for the introduction of distortion into spherical wave front redirected toward the enemy radar.

According to the present invention, a switching cross-eye countermeasure system is disclosed in which two common channels are provided for initially storing an enemy radar signal. Both ends of each common channel are controlled by an RF switching element to create a single common path through which a received pulse propagates from one port to the other port, and vice versa. The received pulse is delayed in the delay line of one common channel for a period at least as long as the pulse width of the received radar pulse and then the switches are transitioned to allow the pulse through to the second common channel.

Other objects, features and advantages of the present invention will become more apparent in light of the following detailed description of a preferred embodiment thereof, as illustrated in the accompanying drawing.

BRIEF DESCRIPTION OF THE DRAWING

The single FIGURE comprises a schematic block diagram of an embodiment of a dual common channel cross-track system according to the present invention.

DESCRIPTION OF THE PREFERRED EMBODIMENT

Referring initially to the drawing, a radar countermeasure system having dual common channels according to the present invention will now be described. Antenna 10 and antenna 12 are mounted at spaced apart locations on the carrying vehicle (not shown) such as near the wing tips. Both the antenna 10 and the antenna 12 serve the combined function of receiving microwave energy from pulses transmitted from the victim radar of an enemy vehicle and transmitting microwave energy provided thereto by the countermeasure equipment on the carrying vehicle. A waveguide 14 and a waveguide 16 lead from antenna 10 and antenna 12, respectively, to the circuitry of the countermeasure system which would normally be positioned in a more central portion of the carrying vehicle. Of course, rather than a combined unit, each antenna 10 and antenna 12 could comprise a separate transmit antenna, including a ferrite isolator in the feed path thereof, and a separate receiving antenna with a transmit/receive (T/R) protection device but a separate transmit and receive antenna is less desirable because of possible phase discrepancies therebetween.

A circulator 18 is connected to waveguide 14 at the juncture with a waveguide 20 and 22 and a circulator 24 is connected to the waveguide 16 at the juncture with a waveguide 26 and a waveguide 28. The circulator 18 is selected to have ±2° of phase tracking between the incoming and outgoing paths. As is well known to those of ordinary skill, the circulator is a coupling device often used where incoming and outgoing high frequency waveforms use a single antenna for both transmission and reception. For example, in the illustrated embodiment an outgoing radar signal is coupled from waveguide 20 to the waveguide 14 and antenna 10 while the receive path through waveguide 22 is electrically isolated to prevent overdriving of the pulse detector or other receiver type circuitry. However, incoming radar energy from a victim radar travels from the antenna 10 through waveguide 14 and is passed by the circulator 18 only to waveguide 22.

A particular feature of the dual common channel countermeasure system of the present invention is that a pulse of radar energy received at the location of either antenna 10 or antenna 12 is amplified and delayed sequentially in the two common channels prior to being retransmitted so that phase distortion normally inherent in such devices as amplifiers and delay lines affects the phases of the retransmitted pulses equally. This is significant in the "cross-eye" countermeasure technique because even a small phase difference unintentionally introduced into one of the retransmitted pulses, such as 2°–6°, will not create the necessary discontinuity into the phase front and the location of the carrying vehicle can be easily identified by the victim radar. For a more complete understanding of the "cross-eye" countermeasure concept, the references cited in the prior art section of this application should be consulted.

Referring still to the drawing, a particular feature of the "cross-eye" type dual common channel countermeasure system of the present invention is that one of two common channels is connected to each antenna for receiving and storing the radar pulse waveform transmitted by the victim radar. The output of one channel is then fed to the input of the other channel, and vice versa, so that any phase distortion which is normally inherent in such devices as amplifiers and delay lines will affect the two waveforms equally. Hence, the waveforms propagate through the channel sequentially and the composite path is almost entirely common for both waveforms thereby eliminating phase distortion in the retransmitted radar waveforms. Referring again to the drawing, a first common channel has an input end controlled by an RF switch 30. The RF switch 30 may be of the diode or ferrite type of microwave switch and is selected to have an equal phase shift in each of the two arms. The switching speed capability of the RF switch 30 should be less than 100 nanoseconds while maintaining phase tracking in each arm within 2°. The RF switch 30 has its input terminal 32 normally gated in the ON condition allowing electromagnetic energy to propagate into the first common channel from the waveguide 22. An electromagnetic signal propagates through the first common channel in one direction only (bottom-to-top in the drawing) and a signal gated into the channel by the switch 30 is presented to a delay line 34 where it is stored. The delay line 34 may be an acoustic bulk wave type or merely coiled lengths of waveguides so long as it is capable of storing a radar signal for a period of time greater than the width of the radar pulse anticipated to be received from the victim radar so that the entire radar signal waveform received by antenna 10 is stored. The delay line 34 is connected to a low distortion amplifier 36 which may be one such as the well known traveling wave tube type, such as a Raytheon QKW-1710. The output end of the first common channel is controlled by an RF switch 38, having the same switching speed and phase shift characteristics as the RF switch 30, which has its normally closed terminal 40 coupled to the waveguide 20.

In a similar manner a second common channel has its input end controlled by an RF switch 40, selected to be identical to the RF switch 30, which has its normally closed terminal coupled to waveguide 28. Electromagnetic energy also propagates through the second common channel in only one direction (bottom-to-top in the drawing) and a radar signal received at antenna 12 enters the second common channel for presentation to a delay line 44 for storage. The delay line 44 may be substantially identical to the delay line 34 so that it is capable of storing the entire waveform of a radar signal for a period of time greater than the width of the pulse anticipated to be received from the enemy radar. The second common channel also includes an amplifier 46, preferably a low distortion amplifier identical to that in the first common channel. The output end of the second common channel is controlled by an RF switch 48 which has its normally closed terminal 50 coupled to waveguide 26.

A key feature of the cross-eye type countermeasure system according to the present invention is that the first and second common channels are initially coupled to receive a pulsed radar signal from a victim radar which is illuminating the carrying vehicle and storing that precise waveform within the respective channel. Next, all of the switches are transitioned so that the output from one feeds the input of the other and the stored waveform propagates through the other channel. To accomplish this, the switch 38 at the output end of the first common channel has its normally open terminal 52 connected to a waveguide 54 which is in turn coupled to the normally open terminal 56 of RF switch 40 at the input end of the second common channel. Similarly, the normally open terminal 58 of the RF switch 48 is connected to a waveguide 60 which is in turn coupled to the normally open terminal 62 of the RF switch 30 at the input end of the first common channel. It will be appreciated by those of ordinary skill that the RF switches are not required to sample the incoming radar pulse since the switches are transitioned after the pulse is stored. This is significant because each switch must only operate at microsecond cycle times rather than nanosecond cycle times which would be required if a pulse sampling technique as described in the prior art section were employed.

As more fully described in the prior art section of this application and the references cited therein, a radar countermeasure apparatus of the "cross-eye" type requires the introduction of a 180° phase shift into one of the two waveforms transmitted back along the azimuth from which the illuminating pulses were received. Accordingly, a phase shift device 66, is disposed in the waveguide 26, one of the non-common portions of the channel. The phase shift device itself could be a waveguide which is twisted 180° or one half turn or it could be a ferrite phase shifter or a diode phase shifter so long as it were able to introduce a precise 180° phase shift into the signal waveform propagating therethrough.

The control circuit for the RF switches includes a RF pulse detector 64 which is coupled to the waveguides 22 and 28 for sensing a radar pulse from the victim radar that strikes either the antenna 10 or the antenna 12. The output from the pulse detector 64 triggers a one-shot multivibrator 70 and in turn presents a suitable gate signal to transition the RF switches 38 and 48 simultaneously to their non-stable states. The output of the pulse detector 64 is delayed in the delay unit 72 before being presented to the one-shot 74 and finally to the switches at the input end of the common channel, RF switches 30 and 40. Both the one-shot 70 and 74 have a cycle time of slightly greater than the delay time of the delay 34 or the delay 44 plus the width of the received radar pulse. The delay 72 is selected so that it has a delay time comparable to the time period of either the delay unit 34 or the delay unit 44, the reason therefore being explained in greater detail hereinafter.

In operation, in order to act as a "cross-eye" type countermeasure it is important to control the relative amplitude and phase of the two signals retransmitted toward the enemy radar, the relative phase control being the most critical. For maximum destructive interference, so as to provide a non-spherical wave front, it is essential that the signal retransmitted by the two antennas be substantially out of phase with one another. Because of the frequency range in which microwave radar operates, it has been previously considered practically impossible to maintain the 180° phase difference required between the pulses to make the probability of confusing the enemy radar sufficiently high to consider the "cross-eye" technique viable. The present invention has solved this problem within the capability of existing technology by propagating the illuminating enemy radar signal through a common path so that any distortion inherent in the waveguides, amplifiers, delay lines, etc. will affect the retransmitted pulses equally and the only phase shift in the system is that intentionally introduced by the phase shift 68 and the unintentional phase shift associated with the non-common signal path. Accordingly, as an illuminating pulse from a victim aircraft strikes the carrying aircraft it is received by both the antenna 10 and the antenna 12 and is presented through the input end of the first common channel at switch 30 and also to the input of the second common channel at switch 40. Each of the input switches are in their normally closed position, identified as NC in the drawing, so that microwave energy received at the input end passes immediately into the respective delay units where it is stored.

Simultaneously, the RF pulse detector 64 senses the received radar pulse as it propagates through either the waveguide 22 or the waveguide 28 and presents an output signal to the one-shot 70. With the received radar pulse still in the delay units of the respected channels, the one-shot 70 causes the switch 38 and the switch 48 at the output end of the two channels to transition to the non-stable state, and the normally open legs are now closed. The delay output from the RF pulse detector 64 via the one-shot 74 now causes the RF switch 30 and 40 at the input ends of the common channel to transition to the non-stable state closing the normally open legs at the input end of each channel. With the switching elements at the output ends of the common channels in also their non-stable states, the once stored radar pulse leaves the first common channel by the terminal 52 and passes via the waveguide 54 to the input end of the second common channel. In a similar manner, the once stored radar pulse in the second common channel leaves the output end via the terminal 58 and propagates through the waveguide 60 and enters the second common channel via the terminal 62. While each pulse is stored in the second delay unit, the one-shot 70 reverts to its normal state causing the RF switches 38 and 40 at the output end of the two channels to revert back to the normal condition so that each twice delayed pulse can leave the output end of the respective channel through the normally closed leg. Of course, the phase shift 68 disposed in the waveguide 26 introduces a phase shift in the signal propagating therethrough so that the retransmitted waveform from the antennas 10 and 12 will be precisely out of phase.

As will be appreciated by those of ordinary skill, in this system if both antennas receive an illuminating pulse at the same instant, the retransmission of the pulse will also occur at the same relative instant. If the illuminating radar is at an angle with respect to the common front of the two antennas 10 and 12, then one of the antennas will receive the pulse sooner than the other by a time corresponding to the difference in the received instant but for the 180° phase shift.

Thus, although the invention has been shown and described with respect to the preferred embodiments thereof, it should be understood by those skilled in the art that the foregoing and various other changes and omissions in the form and detail thereof may be made without departing from the spirit and scope of the invention.

Having thus described typical embodiments of our invention, that which we claim as new and desire to secure by Letters Patent is:

1. Radar countermeasure apparatus of the type in which a received radar signal is phase shifted by 180° prior to retransmission, comprising:

antenna means adapted to be disposed at spaced apart location on a carrying vehicle for receiving radar pulses and retransmitting the same;

first common channel means having switch means disposed at either end thereof, for, storing the received radar signal and for interconnecting the same to said antenna means;

second common channel means having switch means situated at either end thereof, for storing the received radar signal and for presenting the same to said antenna means;

pulse detector means responsive to the radar pulse received by said antenna means for alternating the interconnection of said first common channel means and said second common channel means so that a radar pulse is sequentially presented to one of said common channel means and then to the other of said common channel means; and pulse shift means connected to one of said common channel means for shifting the phase of one of said received radar pulses prior to retransmission by said antenna means.

2. A radar countermeasure apparatus according to claim 1, wherein said antenna means include a first antenna mountable at one location on a carrying vehicle and a second antenna mountable at spaced location on the carrying vehicle, and wherein a first circulator is connected to said first antenna and wherein a second circulator is connected to said second antenna so that radar signals can be received and transmitted by either said first antenna or said second antenna.

3. Radar countermeasure apparatus according to claim 2, wherein said first common channel means includes an input end with a switch means having a normally closed terminal coupled to said first circulator and an output end with a switch means having a normally closed terminal coupled to said first circulator, and wherein said second common channel means includes an input end with a switch means having a normally closed terminal coupled to said second circulator and an output end with a switch means having a normally closed terminal coupled to said second circulator.

4. Radar countermeasure apparatus according to claim 3, wherein said switch means at the input end of said first common channel has its normally open terminal coupled to a normally open terminal of the switch means at the output end of said second common channel, and wherein the switch means at the input end of said second common channel includes a normally open terminal coupled to a normally open terminal of the switch means at the output end of said first common channel.

5. Radar countermeasure apparatus according to claim 2, wherein said first circulator is coupled to the first common channel by a waveguide, and wherein said second common channel is coupled to said second circulator by a waveguide, and wherein said pulse detector mean senses a radar pulse propagating through said waveguide and in response thereto alternates the interconnection between said first common channel means and said second common channel means.

* * * * *